(12) United States Patent
Voutilainen et al.

(10) Patent No.: US 8,969,779 B2
(45) Date of Patent: Mar. 3, 2015

(54) PHOTODETECTING STRUCTURE WITH PHOTON SENSING GRAPHENE LAYER(S) AND VERTICALLY INTEGRATED GRAPHENE FIELD EFFECT TRANSISTOR

(75) Inventors: Martti Voutilainen, Espoo (FI); Markku Rouvala, Helsinki (FI); Pirjo Pasanen, Helsinki (FI)

(73) Assignee: Nokia Corporation, Espoo (FI)

( * ) Notice: Subject to any disclaimer, the term of this patent is extended or adjusted under 35 U.S.C. 154(b) by 1057 days.

(21) Appl. No.: 13/025,853

(22) Filed: Feb. 11, 2011

(65) Prior Publication Data

US 2012/0205518 A1    Aug. 16, 2012

(51) Int. Cl.
*H01J 40/14*    (2006.01)
*H03K 17/78*    (2006.01)
*H01L 27/00*    (2006.01)
*G01J 1/42*    (2006.01)
*G01J 3/51*    (2006.01)
*G01J 1/04*    (2006.01)

(52) U.S. Cl.
CPC .. *G01J 1/42* (2013.01); *G01J 3/513* (2013.01); *G01J 1/0488* (2013.01)
USPC .............. 250/214 R; 250/214 SW; 250/208.1

(58) Field of Classification Search
CPC ............. G01J 1/00; G01J 1/0488; G01J 1/42; G01J 1/4209; G01J 1/4228; G01J 3/51; G01J 3/513; G01J 3/50; G01J 3/46; B82Y 30/00; B82Y 40/00; B82Y 5/00; H01L 29/1606; H01L 29/16; H01L 29/00; C01B 2204/00; C01B 2204/06; C01B 2204/065; C01B 2204/20

USPC .......... 250/214 A, 216, 214 R, 214.1, 208.1; 257/9, E31.032, E31.127, 432, 57, 59, 257/66, 69, 133–135, 192, 213, 215, 257/225–234, 236, 256–259, 272, 368, 390, 257/391; 427/162; 204/192.26; 438/70; 330/253, 264, 269, 277

See application file for complete search history.

(56) References Cited

U.S. PATENT DOCUMENTS

| 6,833,980 | B1 | 12/2004 | Tsukagoshi et al. |
| 8,581,200 | B2 * | 11/2013 | Engel et al. .............. 250/370.09 |
| 2007/0187694 | A1 | 8/2007 | Pfeiffer |
| 2008/0018232 | A1 | 1/2008 | Zhang et al. |
| 2009/0020764 | A1 | 1/2009 | Anderson et al. |

(Continued)

FOREIGN PATENT DOCUMENTS

| TW | 201012749 | 4/2010 |
| TW | 201133910 | 10/2011 |

OTHER PUBLICATIONS

Ryzhii et al., "Terahertz and infrared photodetection using p-i-n. multiple-graphene-layer structures", J. Appl. Phys. 107, Mar. 9, 2010.*

(Continued)

*Primary Examiner* — Pascal M Bui Pho
(74) *Attorney, Agent, or Firm* — Locke Lord LLP

(57) ABSTRACT

In accordance with an example embodiment of the present invention, an apparatus is provided, including a photodetecting structure with one or more photon sensing layers of graphene; and an integrated graphene field effect transistor configured to function as a pre-amplifier for the photodetecting structure, where the graphene field effect transistor is vertically integrated to the photodetecting structure.

15 Claims, 4 Drawing Sheets

(56) References Cited

U.S. PATENT DOCUMENTS

| | | |
|---|---|---|
| 2009/0174435 A1 | 7/2009 | Stan et al. |
| 2010/0025662 A1 | 2/2010 | Cho et al. |
| 2010/0132771 A1 | 6/2010 | Lu |
| 2010/0206362 A1 | 8/2010 | Flood |
| 2011/0017979 A1 | 1/2011 | Meric et al. |
| 2011/0042650 A1 | 2/2011 | Avouris et al. |
| 2011/0062313 A1* | 3/2011 | Ludwig .................. 250/214 A |
| 2011/0315949 A1 | 12/2011 | Voutilainen et al. |

OTHER PUBLICATIONS

International Search Report of International Application No. PCT/FI2012/050102—Date of Completion of Search: Jun. 26, 2012, 5 pages.

Xia, F. et al., "Graphene and Carbon Nanotube Photonics", IBM Thomas J. Watson Research Center, 2009, IEEE, pp. 217-219.

Avouris, P. et al., "Graphene-based fast electronics and optoelectronics", IBM T.J. Watson Research Center, 2010, IEEE, pp. 23.1.1-23.1.4.

Xia, F. et al., "Graphene Nanophotonics", IBM T.J. Watson Research Center, 2010, IEEE, pp. 76-77.

Lin, Y-M. et al., "Dual-Gate Graphene FETs With fT of 50 GHz", IEEE Electron Device Letters, vol. 31, No. 1, Jan. 2010, pp. 68-70.

Lin, Y-M. et al., "100-GHz Transistors from Wafer-Scale Epitaxial Graphene", Science, vol. 327, Feb. 5, 2010, p. 662.

Lin, Y-M. et al., "Development of Graphene FETs for High Frequency Electronics", IEEE, 2009, pp. 10.2.1-10.2.4.

Mueller, T. et al., "Graphene photodetectors for high-speed optical communications", 20 pages.

Search Report on TW Patent Application No. 101104355—Date of Completion: Jan. 16, 2014—1 page.

* cited by examiner

PHOTODETECTING STRUCTURE WITH PHOTON SENSING GRAPHENE LAYER(S) AND VERTICALLY INTEGRATED GRAPHENE FIELD EFFECT TRANSISTOR

TECHNICAL FIELD

The present application relates generally to apparatuses and methods for sensing photons.

BACKGROUND

An image sensor is an apparatus that converts an optical image into an electric signal. It has been widely used in digital cameras and other imaging devices, such as camera-equipped mobile phones. Most digital cameras use either a CMOS (Complementary Metal-Oxide Semiconductor) sensor or a CCD (Charge Coupled Device) sensor.

SUMMARY

Graphene absorbs photons effectively in visible, infrared and ultraviolet frequencies. The use of graphene as a photodetector is based on the observation that graphene absorbs light very evenly in the whole visible light spectrum. A graphene photo detector may be integrated to a camera sensor system which functions similarly as a CMOS sensor, or like a CCD sensor, or similar.

Various aspects of examples of the invention are set out in the claims.

According to a first aspect of the invention there is provided an apparatus, comprising:
a photodetecting structure with one or more photon sensing layers of graphene; and
an integrated graphene field effect transistor configured to function as a pre-amplifier for the photodetecting structure, where the graphene field effect transistor is vertically integrated to the photodetecting structure.

The term vertically integrated herein is used to distinguish from prior art solutions in which an amplifier is horizontally integrated on the side of a pixel. Vertically integrated means integration in a vertical direction. When a photodetecting structure and an amplifier layer are manufactured or placed on top of each other in an integrated circuit, they are vertically integrated. The vertical direction herein may refer to a direction perpendicular to the photodetecting structure or layer, in other words, the direction perpendicular to the surface of the photocell/pixel.

In an example embodiment, there is provided a graphene photosignal pre-amplifier. In an example embodiment, photosignal pre-amplifiers are integrated into the photodetecting layers or structures of the apparatus such that they reside in between the photodetecting layers or structures.

In an example embodiment, said photodetecting structure is configured to convert photons into an electrical signal, and said pre-amplifier is configured to amplify that signal.

In an example embodiment, said pre-amplifier is a charge-sensitive charge-to-voltage conversing pre-amplifier.

In an example embodiment, the apparatus comprises in a stacked structure:
said photon sensing layer(s); and
said pre-amplifier above said photon sensing layer(s).

In an example embodiment, the apparatus comprises a plurality of layers on top of each other, each layer comprising said photodetecting structure and said vertically integrated graphene field effect transistor. The layers may be separated, for example, by a color or color component filtering layer.

In an example embodiment, the apparatus comprises a first photodetecting layer and a first amplifier layer that is vertically integrated to the first photodetecting layer on top of a second photodetecting layer and a second amplifier layer that is vertically integrated to the second photodetecting layer.

In an example embodiment, the apparatus comprises a layered structure comprising a first photodetecting layer and a first amplifier layer on top of a second photodetecting layer and a second amplifier layer, the first and second photodetecting and amplifier layers being on top of a third photodetecting layer and a third amplifier layer.

In an example embodiment, the apparatus is configured to: detect, by a first photodetecting structure or layer, and amplify, by a first pre-amplifier vertically integrated thereto, photons of light with a plurality of color components; and detect, by a second photodetecting structure or layer, and amplify, by a second pre-amplifier, below said first photodetecting structure or layer, photons of filtered light having at least one of said color components filtered by color component filtering layer.

In an example embodiment, said photodetecting structure comprises source and drain electrodes configured to function as gates for the graphene field effect transistor. In an example embodiment, said source and drain electrodes are configured to function as top gates for the graphene field effect transistor.

In an alternative embodiment, said photodetecting structure comprises a source electrode configured to function as a gate (e.g., top gate) for the graphene field effect transistor, an a drain electrode comprised by said photodetecting structure is connected to ground. It may be directly connected to signal ground.

In an alternative embodiment, said photodetecting structure comprises a drain electrode configured to function as a gate (e.g., top gate) for the graphene field effect transistor, an a source electrode comprised by said photodetecting structure is connected to ground. It may be directly connected to signal ground.

In an example embodiment, the apparatus comprises a graphene nanoribbon as the channel of the graphene field effect transistor. In an example embodiment, the graphene nanoribbon consists of a monolayer or bilayer of graphene.

In an example embodiment, the apparatus comprises said graphene field effect transistor implemented in an amplifier layer and additionally a reset transistor integrated into said amplifier layer configured to reset generated charge when needed.

In an example embodiment, the apparatus is selected from the group consisting of: an image sensor for a black and white image system, and an image sensor of a color image system, such as an RGB-coded system. In an example embodiment, the apparatus is a graphene-based electrical circuit for an image sensing device.

In an example embodiment, the apparatus is a handheld mobile communication device, such as a mobile phone. In an example embodiment, the apparatus is a digital camera. In certain embodiments, the apparatus is a digital storage camera, mobile phone camera, a security camera, or an embedded camera structure.

According to a second aspect of the invention there is provided a method, comprising:
detecting photons in a photodetecting structure with one or more photon sensing layers of graphene; and
amplifying photocurrent generated by the photodetecting structure in a graphene field effect transistor functioning as a pre-amplifier for the photodetecting structure, where the graphene field effect transistor is vertically integrated to the photodetecting structure.

Said photocurrent may mean an electrical current generated by photons in the photon sensing layer(s).

In an example embodiment, a graphene FET pre-amplifier is integrated into a graphene-based photodetector. A combination of a graphene photodetector and a graphene FET is formed.

In an example embodiment, transparent layers of pre-amplifiers are applied between the photon sensing graphene layers and between structural color reflection filter elements. In an example embodiment, pre-amplifier's location is ultimately close to the location of the light absorption cell (photon sensing graphene layer(s)). In an example embodiment, pre-amplifier is made with the same process as the light absorption cell. In an example embodiment, pre-amplifier is made of the same material, graphene, as the light absorption cell.

In an example embodiment, the method comprises providing a stacked structure comprising:
said photon sensing layer(s); and
said pre-amplifier above said photon sensing layer(s).

In an example embodiment, the method comprises providing said stacked structure for one color or a set of colors on top of a corresponding stacked structure of another color or another set of colors.

In an example embodiment, the method comprises:
using source and drain electrodes comprised by said photodetecting structure as gates for the graphene field effect transistor.

In an example embodiment, the method comprises using a graphene nanoribbon as the channel of the graphene field effect transistor.

In an example embodiment, the method comprises integrating a reset transistor in an amplifier layer where also said graphene field effect transistor is implemented.

In an example embodiment, the method comprises:
manufacturing said photodetecting structure with one or more photon sensing layers of graphene and said vertically integrated graphene field effect transistor by chemical vapor deposition.

In an example embodiment, amplification and light detection of graphene photodetector is implemented by steering light in a structure so that the photodetector's source and drain electrodes serve as top gates for a pre-amplifier made from a graphene field effect transistor. In an example embodiment, a pre-amplifier made of monolayer or bilayer graphene field effect transistor is located above a photodetecting structure. In an example embodiment, in an amplifier layer there is a reset transistor used to remove the charge generated by leakage currents and by signal charge generated by earlier photocurrent from the detector's source and drain electrodes. In an example embodiment, a pre-amplifier graphene field effect transistor uses multiple gates formed from multiple source or drain electrodes of a photodetector.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well. Any appropriate combinations of the embodiments may be formed.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Example embodiments of the present invention and their potential advantages are understood by referring to FIGS. 1 through 8 of the drawings. In the following description, like numbers denote like elements.

Figure 1:
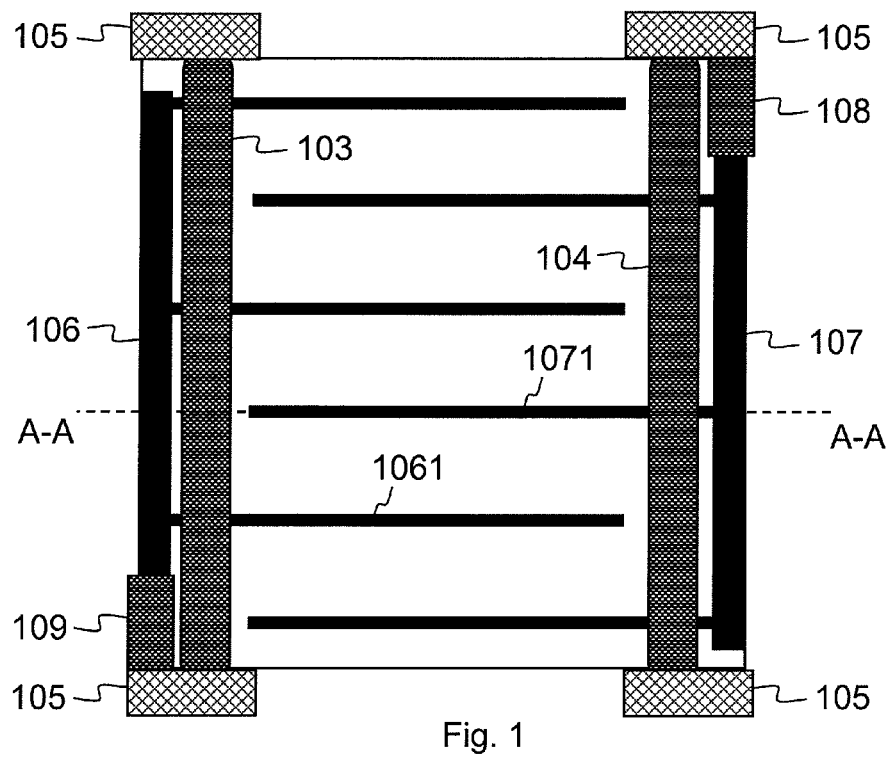
FIG. 1 shows a top view of a graphene-based photodetector with a pre-amplifier in accordance with an example embodiment of the invention.

An image sensor typically comprises a grid of pixels. The area of each pixel is typically around one square micrometer. FIG. 1 shows a top view of the structure of a graphene-based photodetector with a pre-amplifier in the area of one pixel in an example embodiment. A sequence of a photodetecting structure and an amplifier layer is repeated in a vertical direction in the photodetector so that each color of a color system can ultimately be detected (or obtained). This is described in more detail in the connection of FIG. 2. In FIG. 1 there is shown a first or an uppermost photodetecting structure with a pre-amplifier. The source and drain electrodes 106 and 107 of the photodetecting structure reside above photon sensing layers of graphene (more clearly shown in FIG. 2). The source and drain electrodes 106 and 107 have a finger geometry. The fingers of the electrodes form an interdigitated pattern. The reference numeral 1061 shows one of the fingers of the source electrode 106, and the reference numeral 1071 shows one of the fingers of the drain electrode 107. The source and drain electrodes 106 and 107 may be of metal. They collect the holes and electrons generated by photons in the photon sensing layers.

The source and drain electrodes 106 and 107 of the photodetecting structure serve as gates for a graphene-based field effect transistor (FET) in an amplifier layer above the photodetecting structure. The graphene FET therefore functions as a pre-amplifier for the photodetecting structure amplifying the photocurrent generated by the photodetecting structure. The graphene FET amplifier channel 104 is implemented in an example embodiment by a graphene nanoribbon, the graphene FET (GFET) thereby forming a graphene nanoribbon field effect transistor (GNR-FET). In an example embodiment the graphene nanoribbon consists of a monolayer or bilayer of graphene.

In an example embodiment, the amplifier layer additionally comprises a reset transistor 108. In an example embodiment, the reset transistor 108 is also made of graphene. The logical operation of the reset transistor may correspond to conventional reset transistors. It functions as a switch configured to remove generated charge when needed. The generated charge herein refers, for example, to the charge generated by leakage currents and/or by an earlier photocurrent from the detector's source and drain electrodes 106 and 107. The reset transistor 108 and the graphene FET channel 104 are connected to control electronics 105. The control electronics 105 may reside at the side(s) of the pixel.

A second amplifier channel 103 and a second reset transistor 109 function similarly as the channel 104 and reset transistor 108, and are similarly connected to control electronics 105. Then an amplified signal can be obtained as a differential signal, that is, as a sum of signals of amplifier channels 103 and 104.

In an alternative embodiment, one of the electrodes 106 and 107 (either the source electrode 106 or the drain electrode 107) is connected to signal ground. In this example embodiment, the other of the amplifier channels 103 and 104 is not needed.

Figure 2:
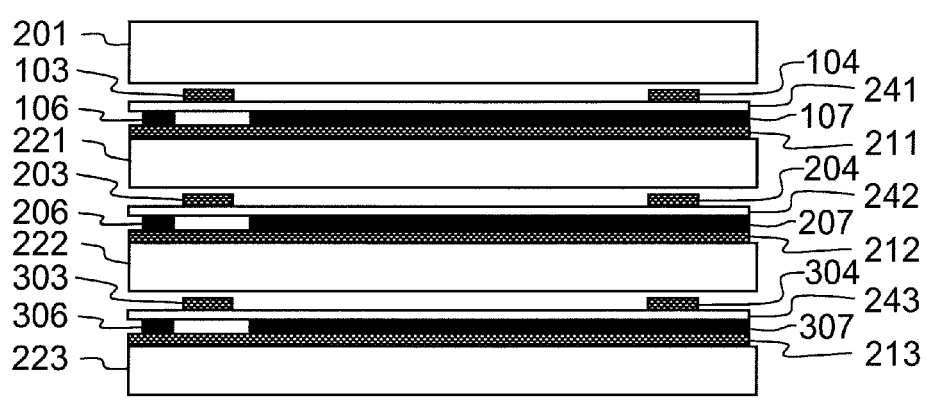
FIG. 2 shows a sectional view of the photodetector of FIG. 1 in accordance with an example embodiment of the invention.

FIG. 2 shows a sectional view of the photodetector of FIG. 1 in accordance with an example embodiment of the invention. A cross-section has been made along the line A-A shown in FIG. 1. On the top the detector comprises an anti-reflective coating 201 for all color components. Below that layer the detector comprises a first photodetecting layer implementing the first photodetecting structure, and a first amplifier layer implementing a first pre-amplifier above the first photodetecting layer. In more detail, the first photodetecting layer comprises first photon sensing layer(s) 211 made of graphene. There may be more than one layer or several layers of graphene on top of each other. Above the first photon sensing layer(s) 211 the structure comprises the source and drain electrodes 106 and 107 of the first photodetecting structure. A dielectric layer 241 above the source and drain electrodes 106 and 107 and below the graphene FET channels 103 and 104 of the first amplifier layer separates the first photodetecting structure from the first amplifier layer. The source and drain electrodes 106 and 107 of the first photodetecting structure serve as top gates for the graphene FET in the first amplifier layer above the first photodetecting structure. The graphene FET therefore functions as a pre-amplifier for the first photodetecting structure amplifying the photocurrent generated by the first photodetecting structure.

Below the first photodetecting structure the detector comprises a first color (or color component) filter layer 221. The first color filter layer 221 passes other color components, but reflects or absorbs a first color component of a color system. In this example embodiment, the first color component is blue of the RGB color system.

Below the first color filter layer 221 the detector comprises a second photodetecting layer implementing a second photodetecting structure, and a second amplifier layer implementing a second pre-amplifier above the second photodetecting layer. The second photodetecting layer and photodetecting structure, and the second amplifier layer and pre-amplifier basically correspond in both structure and operation to the first photodetecting layer and photodetecting structure, and the first amplifier layer and pre-amplifier, respectively. In more detail, the second photodetecting layer comprises second photon sensing layer(s) 212 made of graphene. There may be more than one layer or several layers of graphene on top of each other. Above the second photon sensing layer(s) 212 the structure comprises source and drain electrodes 206 and 207 of the second photodetecting structure. A dielectric layer 242 above the source and drain electrodes 206 and 207 and below graphene FET channels 203 and 204 of the second amplifier layer separates the second photodetecting structure from the second amplifier layer. The source and drain electrodes 206 and 207 of the second photodetecting structure serve as top gates for the graphene FET in the second amplifier layer above the second photodetecting structure. The graphene FET therefore functions as a pre-amplifier for the second photodetecting structure amplifying the photocurrent generated by the second photodetecting structure.

Below the second photodetecting structure the detector comprises a second color filter layer 222. The second color filter layer 222 passes other color components, but reflects or absorbs a second color component of the color system. In this example embodiment, the second color component is green of the RGB color system.

Below the second color filter layer 222 the detector comprises a third photodetecting layer implementing a third photodetecting structure, and a third amplifier layer implementing a third pre-amplifier above the third photodetecting layer. The third photodetecting layer and photodetecting structure, and the third amplifier layer and pre-amplifier basically correspond in both structure and operation to the first and second photodetecting layers and photodetecting structures, and the first and second amplifier layers and pre-amplifiers, respectively. In more detail, the third photodetecting layer comprises third photon sensing layer(s) 213 made of graphene. There may be more than one layer or several layers of graphene on top of each other. Above the third photon sensing layer(s) 213 the structure comprises source and drain electrodes 306 and 307 of the third photodetecting structure. A dielectric layer 243 above the source and drain electrodes 306 and 307 and below graphene FET channels 303 and 304 of the third amplifier layer separates the third photodetecting structure from the third amplifier layer. The source and drain electrodes 306 and 307 of the third photodetecting structure serve as top gates for the graphene FET in the third amplifier layer above the third photodetecting structure. The graphene FET therefore functions as a pre-amplifier for the third photodetecting structure amplifying the photocurrent generated by the third photodetecting structure.

Below the third photodetecting structure the detector optionally comprises a third color filter layer 223. The third color filter layer 223 passes other color components, but reflects or absorbs a third color component of the color system. In this example embodiment, the third color component is red of the RGB color system. It should be noted however, that the order of the color filters (layers 221-223) can be chosen to be different from the one presented above. Furthermore, alternatively the color system may be different from the RGB color system. The number of photodetecting structures with pre-amplifiers on top of each other depends on the color system applied.

As to the photon sensing and amplifier operation in the current embodiment it is noted that a major part of all incoming photons (or incoming light) enter the first photon sensing layer(s) 211. The graphene FET above the first photon sensing layer(s) 211 is substantially transparent for the incoming photons, since a single graphene layer absorbs only around 2.3 percent of incoming photons, and the area of the graphene FET only covers a minor area of the photocell formed by the first sensing layer(s) 211. The blue color component is then basically obtained, for example, by subtracting the signal obtained from the second photon sensing layer(s) 212 and amplified by the second pre-amplifier from the signal obtained from the first photon sensing layer(s) 211 and amplified by the first pre-amplifier. Correspondingly, since all color components except the blue color component enter the second photon sensing layer(s) 212, the green color component is basically obtained by subtracting the signal obtained from the third photon sensing layer(s) 213 and amplified by the third pre-amplifier from the signal obtained from the second photon sensing layer(s) 212 and amplified by the second pre-amplifier. And, the red color component is basically directly obtained from the signal obtained from the third photon sensing layer 213 and amplified by the third pre-amplifier.

In the event only a black and white picture is desired, the first photodetecting structure with the first pre-amplifier can be used to obtain the black and white picture, in other words luminance information or similar without computing.

Figure 3:
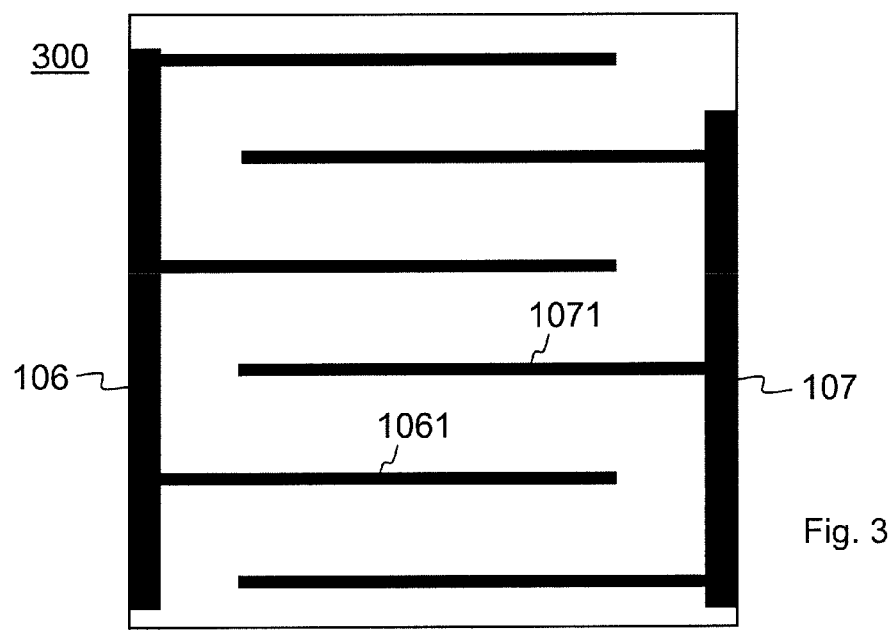
FIG. 3 shows a top view of a photodetecting structure in accordance with an example embodiment of the invention.
Figure 4:
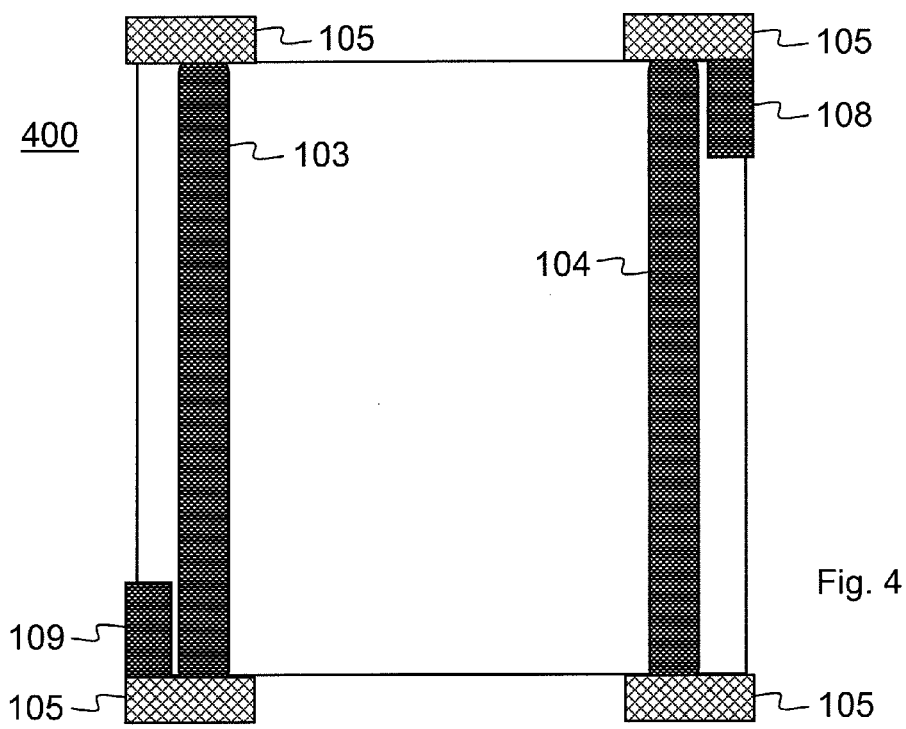
FIG. 4 shows a top view of an amplifier layer in accordance with an example embodiment of the invention.

FIG. 3 shows a top view of a photodetecting structure 300 and FIG. 4 shows a top view of an amplifier layer 400 in an example embodiment. The structure of a photodetector shown in FIG. 1 can be implemented by manufacturing the amplifier layer 400 above the photodetecting structure 300 by a suitable manufacturing method. In an embodiment, chemical vapor deposition (CVD) is used as the manufacturing method.

Figure 5:
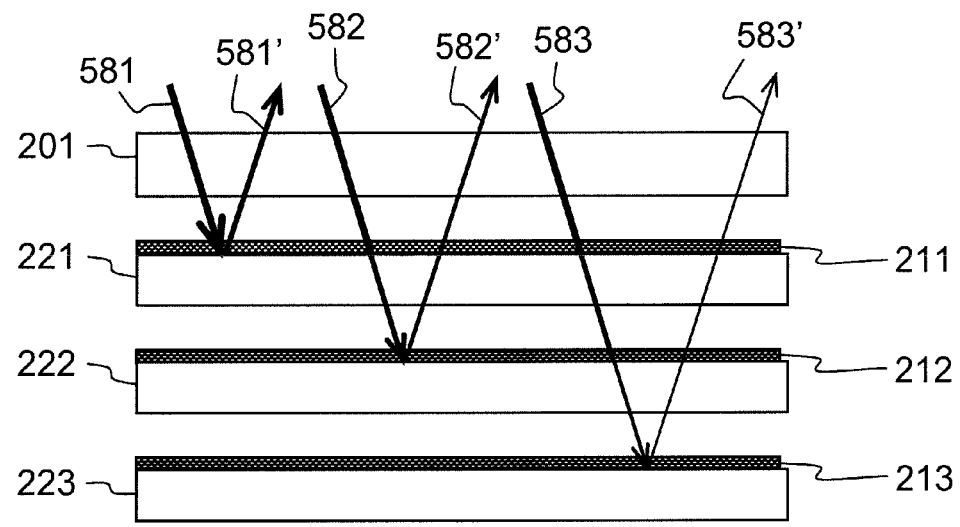
FIG. 5 shows the behavior of light in the photodetector in accordance with an example embodiment of the invention.

FIG. 5 shows the behavior of light in the photodetector in an example embodiment. In the embodiment shown in FIG. 5, the color filter layers 221-223 shown in FIG. 2 have been implemented by color reflective layers, although color absorbing layers can be alternatively used. Compared to FIG. 2 certain details of the structure shown therein are not shown in FIG. 5. A first reflective coating functioning as the first color filter layer 221 reflects from the incoming light 581 the wavelength range of the blue color component 581'. A second reflective coating functioning as the second color filter layer 222 reflects from the incoming light 582 (from which the first reflective coating has reflected the blue color component already) the wavelength range of the green color component 582'. And, the optional third reflective coating functioning as the third color filter layer 223 reflects from the incoming light 583 (from which the first and second reflective coatings 221 and 222 have reflected the blue and green color components already) the wavelength range of the red color component 583'. The use of the reflective coatings 221-223 basically double the light detection efficiency since then also the back reflected signals can be used.

Figure 6:
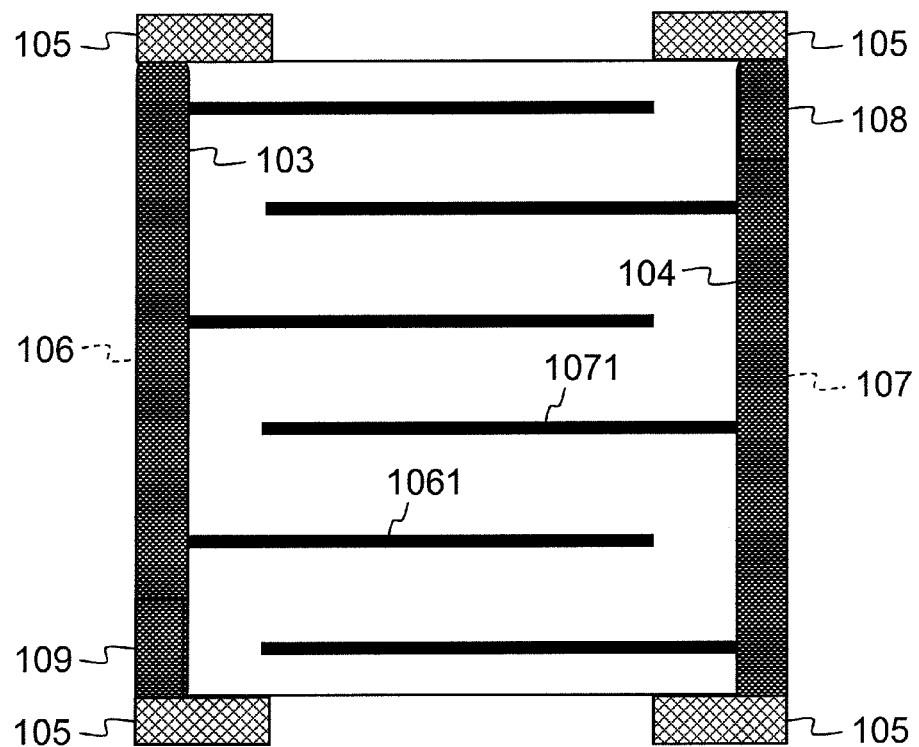
FIG. 6 shows a top view of a photodetector with a pre-amplifier in accordance with another example embodiment of the invention.

FIG. 6 shows a top view of a photodetector with a pre-amplifier in another example embodiment. The reference numbering used in FIG. 6 completely corresponds to the reference numbering in FIG. 2. This embodiment presents an alternative layout for the pre-amplifier transistors. The pre-amplifier transistor channels 106 and 107 have been placed directly on top of the source and drain electrode backbones so that the electrode which acts as a top gate for the pre-amplifier covers the whole channel area of the pre-amplifier transistor.

Figure 7:
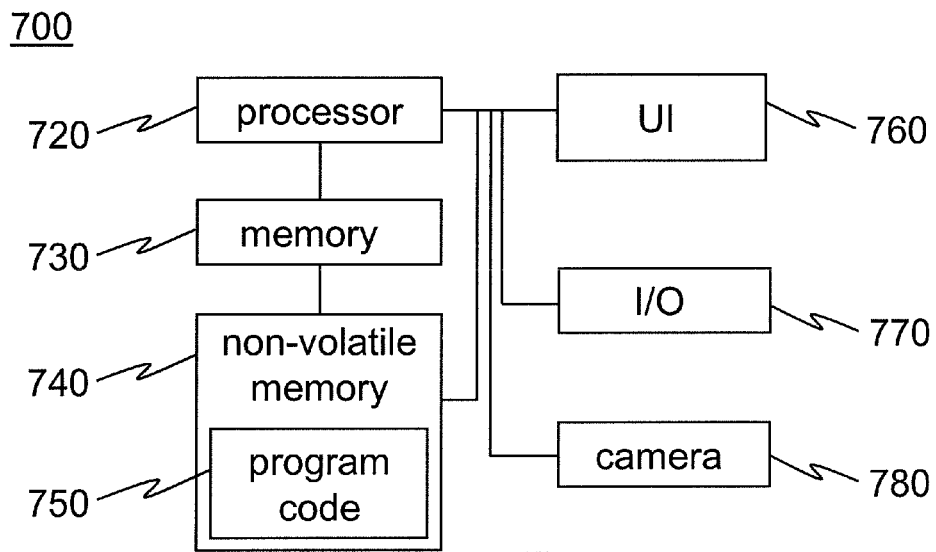
FIG. 7 shows an example block diagram of an apparatus according to an example embodiment of the invention.

FIG. 7 shows an example block diagram of an apparatus 700 according to an example embodiment. The apparatus 700 comprises at least one non-volatile memory 740 configured to store computer programs or software comprising computer program code 750. The apparatus 700 further comprises at least one processor 720 for controlling the operation of the apparatus 700 using the computer program code 750, a work memory 730 for running the computer program code 750 by the at least one processor 720, and optionally an input/output system 770 for communicating with other entities or apparatuses. Accordingly, the input/output system 770, if present, comprises one or more communication units or modules providing communication interfaces towards a communication network and/or towards another apparatus. The apparatus 700 comprises a user interface 760 enabling a user to use the device.

The apparatus 780 further comprises a camera module 780. The camera module 780 comprises a desired amount of graphene-based photodetectors with vertically integrated pre-amplifiers described in the example embodiments. The camera module 780 is connected to the at least one processor 720. It may be controlled by the at least one processor 720. Instead or in addition, the camera module 780 may comprise its own processor controlling its operation or the operation of the whole apparatus 700. Depending on whether the apparatus is a mobile communication device housing a camera, or, for example, a mere digital camera, the structure of the apparatus may deviate from that presented in FIG. 7. One or more of the blocks may be omitted and/or one or more additional blocks may be added in an actual implementation.

Figure 8:
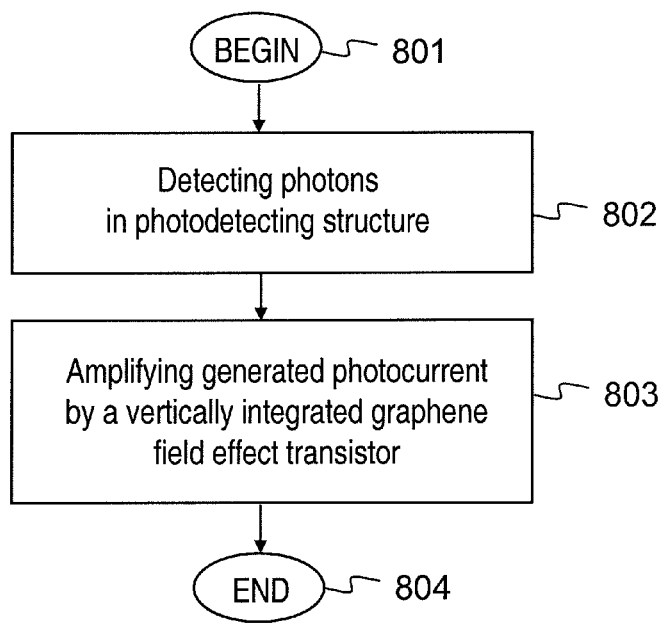
FIG. 8 shows a rough flow diagram showing a method in accordance with an example embodiment of the invention.

FIG. 8 is a flow diagram showing a method in accordance with an example embodiment. The method begins at step 801. In step 802, photons are detected in a photodetecting structure with one or more photon sensing layers of graphene. In step 803, photocurrent generated by the photodetecting structure is amplified in a graphene field effect transistor functioning as a pre-amplifier for the photodetecting structure, where the graphene field effect transistor is vertically integrated to the photodetecting structure. The method ends at step 804.

Furthermore, the concept can be used also in other frequencies such as infrared and ultraviolet.

Without in any way limiting the scope, interpretation, or application of the claims appearing below, certain technical effects of one or more of the example embodiments disclosed herein are listed in the following: A technical effect is to keep the total capacitance connected into pre-amplifier input gate on an acceptable level by integrating a pre-amplifier structure into a detector element. Another technical effect is simple fabrication. Another technical effect is low material cost. Another technical effect is thin structure. Yet another technical effect is the suitability of using the graphene-based photodetector in low light intensity conditions. Yet another technical effect is reduced non-photoactive area of a pixel in the case the pre-amplifier is on top of a photocell.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

If desired, the different functions discussed herein may be performed in a different order and/or concurrently with each other. Furthermore, if desired, one or more of the above-described functions may be optional.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus, comprising:
a photodetecting structure with one or more photon sensing layers of graphene; and
an integrated graphene field effect transistor configured to function as a pre-amplifier for the photodetecting structure, wherein the graphene field effect transistor is vertically integrated to the photodetecting structure, and wherein said photodetecting structure comprises source and drain electrodes configured to function as gates for the graphene field effect transistor.

2. The apparatus of claim 1, wherein said photodetecting structure is configured to convert photons into an electrical signal, and said pre-amplifier is configured to amplify that signal.

3. The apparatus of claim 1, comprising in a stacked structure:
said photon sensing layer(s); and
said pre-amplifier above said photon sensing layer(s).

4. The apparatus of claim 1, comprising a plurality of layers on top of each other, each layer comprising said photodetecting structure and said vertically integrated graphene field effect transistor.

5. The apparatus of claim 1, comprising a graphene nanoribbon as the channel of the graphene field effect transistor.

6. An apparatus according to claim 1, wherein the apparatus is one of: an image sensor for a black and white image system, and an image sensor of a color image system.

7. An apparatus according to claim 6, wherein the color image system is an RGB-coded system.

8. An apparatus according to claim 1, wherein the apparatus is a handheld mobile communication device.

9. An apparatus, comprising:
a photodetecting structure with one or more photon sensing layers of graphene; and
an integrated graphene field effect transistor configured to function as a pre-amplifier for the photodetecting structure, wherein the graphene field effect transistor is vertically integrated to the photodetecting structure, and wherein said graphene field effect transistor is implemented in an amplifier layer and a reset transistor is integrated into said amplifier layer and is configured to reset generated charge when needed.

10. A method, comprising:
detecting photons in a photodetecting structure with one or more photon sensing layers of graphene;
amplifying photocurrent generated by the photodetecting structure in a graphene field effect transistor functioning as a pre-amplifier for the photodetecting structure, wherein the graphene field effect transistor is vertically integrated to the photodetecting structure; and
using source and drain electrodes comprised by said photodetecting structure as gates for the graphene field effect transistor.

11. The method of claim 10, comprising providing a stacked structure comprising:
said photon sensing layer(s); and
said pre-amplifier above said photon sensing layer(s).

12. The method of claim 10, comprising providing a plurality of layers on top of each other, each layer comprising said photodetecting structure and said vertically integrated graphene field effect transistor.

13. The method of claim 10, comprising using a graphene nanoribbon as the channel of the graphene field effect transistor.

14. A method according to claim 10, comprising:
manufacturing said photodetecting structure with one or more photon sensing layers of graphene and said vertically integrated graphene field effect transistor by chemical vapor deposition.

15. A method, comprising:
detecting photons in a photodetecting structure with one or more photon sensing layers of graphene;
amplifying photocurrent generated by the photodetecting structure in a graphene field effect transistor functioning as a pre-amplifier for the photodetecting structure, wherein the graphene field effect transistor is vertically integrated to the photodetecting structure; and
integrating a reset transistor in an amplifier layer where said graphene field effect transistor also is implemented.

* * * * *